United States Patent [19]

Korsch

[11] Patent Number: 4,737,021
[45] Date of Patent: Apr. 12, 1988

[54] WIDE-FIELD THREE-MIRROR COLLIMATOR

[76] Inventor: Dietrich Korsch, 10111 Bluff Dr., Huntsville, Ala. 35803

[21] Appl. No.: 842,678

[22] Filed: Mar. 21, 1986

[51] Int. Cl.⁴ .................. G02B 17/06; G02B 23/06
[52] U.S. Cl. ......................................... 350/505
[58] Field of Search ............... 350/505, 442–443, 350/620, 623

[56] References Cited

U.S. PATENT DOCUMENTS

| 3,190,171 | 6/1965 | Reed | 350/505 |
| 4,240,707 | 12/1980 | Wetherell | 350/620 |
| 4,265,510 | 5/1981 | Cook | 350/505 |

OTHER PUBLICATIONS

Korsch, D., "Design & Optimization Technique for Three Mirror Telescopes", App. Optics, 11-1980, pp. 3640–3645.

Korsch, D., "Closed Form Solution for Three-Mirror Telescopes, Corrected for Spherical Aberration, Coma, Astigmatism & Field Curvature", App. Optics, 12-1972, pp. 2986–2987.

Primary Examiner—William H. Punter
Attorney, Agent, or Firm—George J. Porter

[57] ABSTRACT

An improved three mirror collimator (or telescope) having a focal plane (38) positioned on a first side of the optical axis (44) and which directs a diverging beam of radiation upon concave tertiary mirror (36) which is also positioned on the first side of optical axis (44) and which reflects the received radiation to an on-axis convex secondary mirror (34) in a converging pattern. Secondary mirror (34) reflects the received radiation in a first converging, then diverging pattern upon concave primary mirror (32) which is positioned on the second side of optical axis (44). Primary mirror (32) reflects the received radiation as a collimated beam to the real entrance pupil (30) which is located either on or near the optical axis but which need not be precisely centered on the optical axis. When used as a telescope the radiation enters the entrance pupil (30) as a collimated beam and is received by primary mirror (32). Primary mirror (32) reflects the radiation in a first converging then diverging pattern upon on-axis secondary mirror (34) which, in turn, reflects the radiation upon off-axis tertiary mirror (36). The tertiary mirror (36) then reflects and focuses the received radiation upon focal plane (38).

7 Claims, 3 Drawing Sheets

WIDE-FIELD THREE-MIRROR COLLIMATOR

TECHNICAL FIELD

This invention relates generally to the family of relayed image-forming optical systems consisting of three mirrors, and more particularly to an improved three-mirror optical system having a real, accessible entrance (or exit) pupil making it particularly suitable for use as a collimator but which may also be used as a telescope and where the primary and tertiary mirrors are off-centered from the optical axis.

BACKGROUND OF THE INVENTION

There are several prior art three-mirror optical systems currently in use or contemplated for use, but none of which are successful in solving all the difficulties presented by such optical systems usable both as a collimator and a telescope, and particularly as a collimator that requires a real, accessible exit pupil. The principal shortcomings of prior three-mirror optical systems include inaccessability of the exit pupil and/or image plane, a large central obscuration, or exessive dimensions. It should be noted that three mirror optical systems as well as two mirror optical systems should correct as much as possible for the four types of primary aberrations including aspherical aberration, coma, astigmatism, and field curvature. While two mirror configurations are not, per se, a part of the background of this invention it should be noted in passing that all practical configurations can maximally correct only two types of aberrations, usually spherical aberration and coma whereas three mirror optical systems are capable of correcting three or, as in the present invention, all four of such aberrations.

One example of a known state-of-the-art three mirror optical system, which is primarily a telescope, and is relevant to the present invention, is disclosed in U.S. Pat. No. 4,240,707 to Wetherell which shows an on-axis (i.e. on the optical axis) virtual (i.e. non-accessible) entrance pupil. The radiation from an off-axis (i.e. off the optical axis) primary mirror is reflected back to an on-axis convex secondary mirror which in turn reflects the radiation to an off-axis tertiary mirror. The radiation is then reflected from the tertiary mirror to a focal plane which is also off-axis.

More specifically, it can be seen that in Wetherell, the entrance pupil is a virtual entrance pupil. Consequently, the Wetherell system cannot operate as telescope or collimator when an accessible entrance or exit pupil is required. The foregoing is shown clearly in FIG. 3 of Wetherell.

When an optical system is employed as a collimator it is frequently important that the collimated beam remain in a fixed location at the entrance pupil of the optical system to be tested. As discussed above, such a fixed beam location at the entrance pupil of the telescope to be tested is not possible with Wetherell since the entrance pupil is a virtual one. Furthermore, in Wetherell there are no intermediate images, thereby making the suppression of stray light more difficult.

Another example of a relevant three-mirror system is shown in U.S. Pat. No. 4,265,510 to Cook wherein a primary mirror, a secondary mirror, and a tertiary mirror form an anastigmatic relayed image-forming optical system in which the image field is off the optical axis and the entrance pupil coincides with the primary mirror and an intermediate image is formed between the secondary and tertiary mirrors.

A primary object of the present invention is to provide a three-mirror optical system which has a real, accessible entrance (or exit) pupil and a wide, flat image field thereby making the system particularly suitable to be employed as a collimator as well as a telescope.

A second object of the invention is a three-mirror optical system which contains an intermediate image between the primary and secondary mirrors to facilitate the suppression of stray radiation.

A third object of the invention is to provide a three-mirror optical system with a pupil image on or close to the secondary mirror and further with the primary and tertiary mirrors both being off-axis to provide for an unobstructed collimated beam (i.e. with no hole therein) to pass through the exit (or entrance) pupil.

A fourth object of the invention is the improvement of three-mirror optical systems generally.

SUMMARY OF THE INVENTION

In accordance with one preferred form of the invention the radiation, emanating from an off-axis location in the focal plane is received by a concave tertiary mirror, preferably having an aspheric shaped surface, and then is reflected to an on-axis secondary mirror, preferably having a convex aspheric shaped surface, from whence it is reflected to a concave off-axis primary mirror, preferably having an aspheric shaped surface. From the primary mirror the radiation is reflected as a collimated beam out of the on-axis exit (or entrance) pupil. The primary mirror is on a side of the optical axis which is opposite that of the off-axis tertiary mirror and the focal plane.

In accordance with one feature of the invention a real image is formed between the primary mirror and the secondary mirror to facilitate the suppression of stray radiation with appropriate stops.

DETAILED DESCRIPTION OF THE INVENTION

Figure 1:
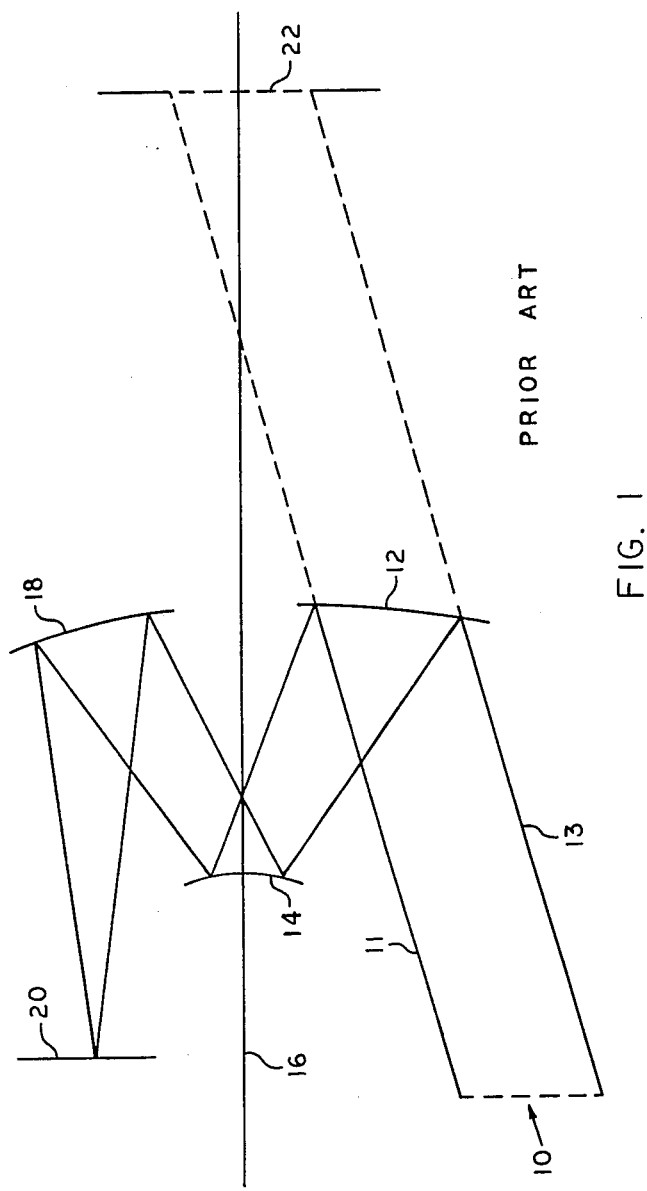
FIG. 1 shows an example of a relevant prior art structure.

Referring now to FIG. 1 there is shown what is believed to be the closest prior art and is, in fact, a schematic diagram of the Wetherell patent (U.S. Pat. No. 4,240,707) discussed briefly above.

In FIG. 1 the collimated beam 10 defined by solid lines 11 and 13 impinges upon the surface of concave primary mirror 12 which reflects the light as a converging beam upon the convex secondary mirror 14 which is centered on the optical axis 16. The concave tertiary mirror 18 receives the diverging beam of light from secondary mirror 14 and reflects such light in a converging pattern so that the image is focussed on focal plane 20. The entrance pupil 22 is imaged on or close to the secondary mirror 14 by the primary mirror 12. To minimize the size of the secondary and approximately center it on the optical axis, its location must approximately coincide with the location of the image of the axially centered entrance pupil formed by the primary.

The entrance pupil 22 is inaccessible because the primary mirror 12 blocks the entering collimated beam 10. As discussed above, the inacessibility of the entrance pupil 22 renders the prior art optical system of FIG. 1 to a rather limited use as a collimator since the beam 10 must move to different positions in accordance with the position of the radiation originating at focal plane 20. Changing the position of the source in plane 20 results in an angular change of the extended beam through the virtual exit pupil 22. This causes beam 10 to move in angle and position everywhere. Because the entrance pupil in FIG. 2 (relating to the present invention) is real and affects the actual beam (not an extension of it), the location of the beam is fixed in the pupil plane. This is an important advantage of this invention.

As will be discussed in detail below the foregoing limitations of use as a collimator do not exist in the present invention shown in FIG. 2.

Figure 2:
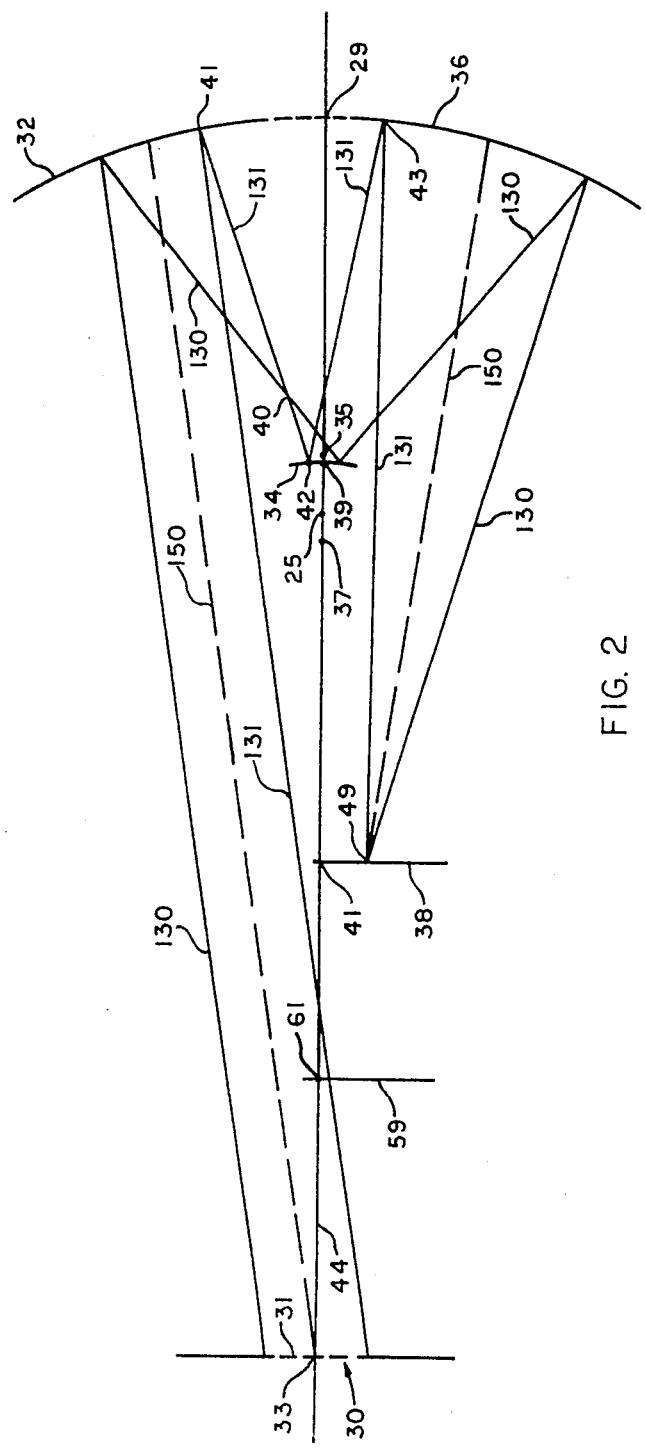
FIG. 2 is a schematic diagram of the three mirror optical system of the present invention.

In FIG. 2 there is shown a preferred embodiment of the present invention wherein the entrance pupil 30 is centrally located on or near the optical axis 44 (precise centering of the pupil on the optical axis is not required) and directs the collimated radiation received from the distant object being viewed upon the concave surface of the primary mirror 32 which is positioned completely on one side of the optical axis 44. The radiation received by primary mirror 32 is reflected in a first converging then diverging pattern upon the secondary mirror 34, which can be aspheric or perhaps spherical in shape. The intermediate image 40 formed between the primary and secondary mirrors 32 and 34 provides a means for suppressing stray radiation by a suitable stop at the intermediate image 40 which is not shown in FIG. 2.

From secondary mirror 34 the radiation is reflected in a diverging pattern upon the concave surface of tertiary mirror 36 which lies completely off the optical axis 44 and on the opposite side thereof from primary mirror 32.

The radiation is then reflected from tertiary mirror 36 in a converging pattern upon focal plane 38 which also lies completely off the optical axis 44 and on the same side thereof as tertiary mirror 36. Because secondary mirror 34 is positioned as shown in FIG. 2 it can be supported without causing beam obstruction.

When the system of FIG. 2 is employed as a collimator, the radiation source can be positioned at any point in the focal plane 38 and will direct radiation upon tertiary mirror 36 in a diverging pattern which will then be reflected from mirror 36 in a converging pattern upon secondary mirror 34. The radiation reflected from secondary mirror 34 will next be reflected in a first converging, then diverging pattern upon the surface of primary mirror 32 and will be reflected therefrom to the exit (entrance) pupil 30 as a collimated beam. When used as a collimator the intermediate image 40 will be formed in the same manner as when the system is employed as a telescope so that stray radiation can be suppressed by appropriate stops at the point of the intermediate image 40.

In one form of the invention which will give near optimum performance all mirror surfaces can be aspheric. However, because of the relatively high focal ratio of the secondary mirror 34, it can be spherical without significant loss of performance. In addition, for a particular configuration of the general geometry of FIG. 2, near optimum performance is obtainable when the tertiary mirror 36 is also spherical.

It will be noted that the prior art structure of FIG. 1 has no intermediate image corresponding to the imtermediate image 40 of FIG. 2 and therefore does not provide the same opportunity for suppressing stray radiation.

In any given optical system there are many sets of mirror parameters which can cooperate with each other to cancel out spherical aberration, coma, astigmatism and field curvature. Simple distortion, i.e. the uniform bulging out or curving in of the sides of an otherwise perfect square, can be, and usually is, corrected by electronic means.

When all three mirror surfaces are allowed to be general conic sections of revolution, the system can be corrected for at least three primary aberrations, usually spherical aberration, coma and astigmatism. In addition, a flat field can be obtained by selecting the mirror curvatures such that the Petzval sum is equal to zero. An even higher degree of correction can be attained by also allowing aconic surfaces.

Figure 3:
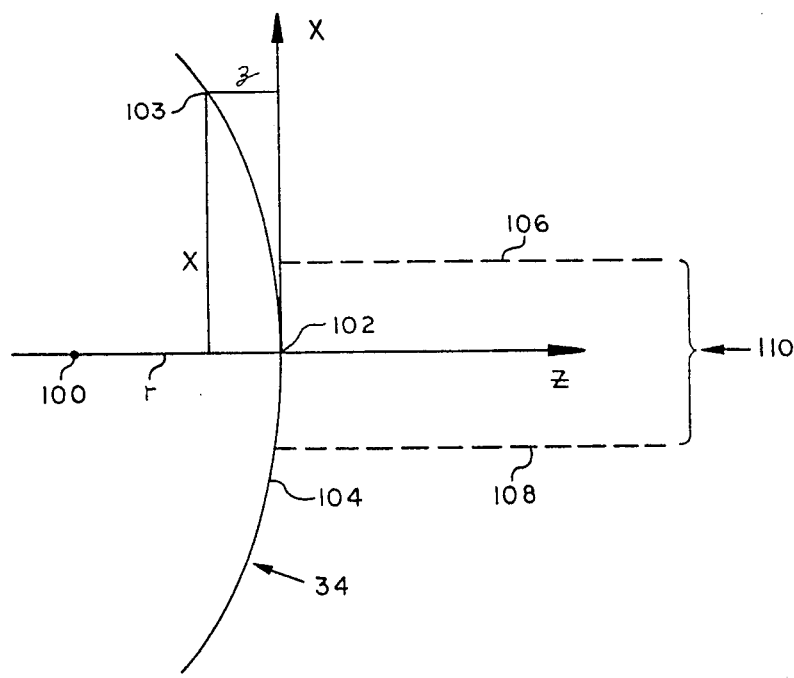
FIG. 3 shows an enlarged view of the secondary mirror of the invention.

In one particular form of the present invention of FIG. 2 the specific parameters of the three mirrors 32, 34, and 36 are illustrated in FIG. 3 which has a vertical coordinate X and a horizontal coordinate Z. Numerical values of the parameters are set forth in Tables I and II below.

Consider first in FIG. 3 the nature of secondary mirror 34 which has a convex hyperbolic surface 104 with the center of curvature at point 100 which lies on the Z axis and is a distance r from the vertex 102 which coincides with the origin of the X-Z coordinate system. The coordinates X and Z of any point 103 on the hyperbolic curve 104 can then be defined by the following general expression:

$$X^2 = 2rZ - (1+\delta)Z^2 \qquad \text{Exp. 1}$$

It should be noted that Exp. 1 is a general expression for a conic section of revolution, in accordance with the following table of values for $\delta$, which is the deformation constant.

If $\delta = 0$, then Exp. 1 is a sphere
If $0 > \delta > -1$, then Exp. 1 is an ellipsoid
If $\delta = -1$, then Exp. 1 is a paraboloid
If $\delta < -1$, then Exp. 1 is a hyperboloid In a hyperbolic curve (or surface) that small angular portion 110 of the curve within the dotted lines 106 and 108 of FIG. 3 is very similar to a spherical surface and, for certain applications, can be treated as such. It is that portion 110 of the hyperbolic curve (or surface) that is, in fact, employed in the present invention as the reflective surface for the radiation from primary mirror 32 to tertiary mirror 36.

Turning now to the general distance parameters of the optical system of FIG. 2 the following data are given in centimeters although other units of distance can be employed since the distances are really only relative.

| | |
|---|---|
| $t_1 = -80$ | (Exp. 2) |
| $d_1 = -17.50$ | (Exp. 3) |
| $d_2 = -d_1$ | (Exp. 4) |
| $s_3' = -30$ | (Exp. 5) |

In Exp. 2 $t_1 = -80$ is the distance of the entrance pupil 30 in FIG. 2 from the extrapolated or projected intersection 29 of the elliptical primary mirror 32 with the optical axis 44 to the primary mirror 32, such distance being measured from the center 33 of the entrance pupil 30 where it crosses the optical axis 44; $d_1 = -17.50$ in Exp. 3 is the distance between the intersection 29 of the extrapolated primary mirror 32 with the intersection 39 of the secondary mirror 34 with the optical axis 44; $d_2 = -d_1$ of Exp. 4 indicates that the intersection 35 of the secondary mirror 34 and the intersection 29 of the extrapolated elliptical tertiary mirror 36 with the optical axis 44. The fact that $d_1$ and $-d_2$ are equal is just a matter of choice of positioning mirrors 32 and 36. $d_1$ and $d_2$ could have different values. The value $s_3' = -30$ in Exp. 5 is the distance between the intersection 29 of tertiary mirror 36 and the intersection 45 of the extended focal plane 38 with the optical axis 44.

Negative or positive values represent directions of distances or measurements. For example, the value $-80$ in Exp. 2 indicates that entrance pupil 30 is to the left of primary mirror 32, the value $-17.50$ indicates that secondary mirror 34 is to the left of primary mirror 32, and the value $-d_1$ in Exp. 4 indicates that the tertiary mirror 36 is, in fact, equal to a $+17.50$ to the right of secondary mirror 34. The value $-30$ in Exp. 5 indicates that the focal plane 38 is to the left of the tertiary mirror 36.

In column IV, in rows 1, 2, and 3, the separation (SEP) distance along the optical axis 44 between primary mirror 32 and secondary mirror 34 is $-17.50$, since secondary mirror 34 is to the left of primary mirror 32 in FIG. 2. Tertiary mirror 36 is a distance of $+17.50$ from secondary mirror 34 along the optical axis 44, and focal plane 38 is separated from tertiary mirror 36 by a distance $-30.00$, as measured between their intersections with the optical axis 44.

In column V (IMD), reading down rows 1, 2, and 3, the primary image distance between the primary mirror 32 and the real image at point 40 in FIG. 2, as measured between their projections on the optical axis 44, is $-14.28$, the secondary image distance between the secondary mirror 34 and the imaginary image point 37 of FIG. 2, as measured between their projections upon the optical axis 44, is $-2.15$, and the final image distance between the tertiary mirror 36 and the focal plane 38, as measured between their projections on the optical axis 44, is $-30.00$.

In column VI, ((PUD) row 1, of TABLE I there is shown the pupil distance between the primary mirror 32 and its pupil image, as measured between their projections on the optical axis 44, is equal to $-17.38$ and located at point 37, just slightly behind and to the left of secondary mirror 34 in FIG. 2. The pupil distance, i.e.

TABLE 1

Basic Parameters of Each of Three Mirrors

| ITEM | I<br>MIRROR | II<br>(CURV)<br>CURVATURE | III<br>(DEF)<br>DEFORMATION | IV<br>(SEP)<br>SEPARATION | V<br>(IMD)<br>IMAGE DISTANCE | VI<br>(PUD)<br>PUPIL DISTANCE |
|---|---|---|---|---|---|---|
| 1. | 32 | −.035021 | −.790972 | −17.50 | −14.28 | −17.38 |
| 2. | 34 | −.077130 | −6.899705 | +17.50 | −2.15 | −.12 |
| 3. | 36 | −.042045 | −.033835 | −30.00 | −30.00 | −36.41 |
|  |  |  | Focal Length = −14.5565896634 |  |  |  |

Referring now to TABLE I there is shown the characteristics of a typical set of parameters of the three mirrors 32, 34, and 36 of the present invention.

TABLE I is divided into six columns labeled I, II, III, IV, V, and VI, and into three rows labeled 1, 2, and 3. The six columns I–VI show, respectively, the particular mirror of mirrors 32, 34, and 36 being considered, the curvature (CURV) of the mirror, the deformation (DEF) of the mirror, the separation (SEP) distance of their projections on the optical axis 44, i.e. the separation distance between the primary and secondary mirrors 32 and 34, between the secondary and tertiary mirrors 34 and 36, and between the tertiary mirror 36 and the focal plane 38. The three rows 1, 2, and 3 show the above-mentioned characteristics of the three mirrors 32, 34, and 36.

The values shown in column II, in rows 1, 2, and 3, for the curvatures of the three mirrors 32, 34, and 36 actually represent the inverse values of the radii thereof. Further, the fact that all of the curvature values are negative indicates that the center of curvature is positioned to the left of the associated mirror, as viewed in FIG. 2.

In column III of TABLE I, (in rows 1, 2, and 3) it can be seen that mirror 32 has a deformation (DEF) constant of $\delta = -0.790972$, i.e., $0 > \delta > -1$, so that the surface of mirror 32 is elliptical in shape, as is the surface of mirror 36 whose deformation value is $\delta = -0.033835$. The surface of mirror 34 has a deformation value of $\delta = -6.899705 < -1$. Therefore, the surface of mirror 34 is hyperbolic, as discussed hereinbefore.

the distance of the pupil image, of primary mirror 32 is completely unrelated to the actual position of secondary mirror but, for ease of construction in making the reflecting surface of secondary mirror 34 as small as possible, it is desirable to position the secondary mirror 34 as close as possible to the pupil image of the primary mirror 32.

The image of the pupil formed by the secondary mirror 34 is an imaginary one and is located in a plane which crosses optical axis 44 at point 25 in FIG. 2, which is a distance (PUD) of $-0.12$ from the intersection of secondary mirror 34 with the optical axis 44.

The distance between the intersection of the tertiary mirror 36 and the optical axis 44 (point 29) to the pupil image (PUD) formed by the radiation reflected by tertiary mirror 36 is $-36.41$. Such pupil image lies in a plane 59 which crosses the optical axis 44 at point 61.

TABLE 2

Parameters Showing the Coordinates of Various Points on the Three Mirrors

| ITEM | I<br>SURFACE | II<br>X VALUE | III<br>Z VALUE |
|---|---|---|---|
|  | For Ray 131 |  |  |
| 1. | (Pupil Entrance 30) | −2.0 | 0 |
| 2. | (Primary Mirror 32) | +9.0410 | −1.4389 |
| 3. | (Secondary Mirror 34) | +.6748 | −.0175 |
| 4. | (Tertiary Mirror 36) | −5.9535 | −.7568 |
| 5. | (Focal Plane 38) | −2.1638 | 0 |
|  | For Ray 150 |  |  |
| 1. | (Pupil Entrance 30) | 0 | 0 |
| 2. | (Primary Mirror 32) | +10.9461 | −2.1144 |
| 3. | (Secondary Mirror 34) | +.3491 | −.0047 |

TABLE 2-continued

Parameters Showing the Coordinates of
Various Points on the Three Mirrors

| ITEM | I<br>SURFACE | II<br>X VALUE | III<br>Z VALUE |
|---|---|---|---|
| 4. | (Tertiary Mirror 36) | −9.2270 | −1.8601 |
| 5. | (Focal Plane 38) | −2.1791 | 0 |
| | For Ray 130 | | |
| 1. | (Pupil Entrance 30) | +2 | 0 |
| 2. | (Primary Mirror 32) | +12.8336 | −2.9151 |
| 3. | (Secondary Mirror 34) | +.0051 | 0 |
| 4. | (Tertiary Mirror 36) | −12.3402 | −3.4420 |
| 5. | (Focal Plane 38) | −2.1950 | 0 |

Referring now to TABLE II there are shown the coordinates of three typical rays 131, 150, and 130 of the radiation entering the entrance pupil 30 of FIG. 2 at five different surfaces labeled surfaces 1 through 5 in column I of TABLE II. Those five surfaces are, respectively, the entrance pupil 30, the primary mirror 32, the secondary mirror 34, the tertiary mirror 36, and the focal plane 38.

Column II shows the vertical or X coordinate position of the three rays 131, 150, and 130 as they impinge upon, or pass through, the above-named five surfaces 30, 32, 34, 36, and 38, respectively.

Column III shows the horizontal or Z position of the three rays 131, 150, and 131 as the pass through or impinge upon the five surfaces 30, 32, 34, 36, and 38 and is measured between the intersection of the particular surface with the optical axis 44 of FIG. 2 and the vertical projection of the point of impingement upon the optical axis 44. The X values are positive or negative depending upon whether they are above or below the optical axis 44, and the Z values are positive or negative depending upon whether the projection of the point of impingement of the ray upon the optical axis 44 is to the right or to the left of the point of intersection of the surface with the optical axis 44.

Thus, for example, ray 131 in FIG. 2 passes through the plane of the entrance pupil 30 at a point where X=−2 and Z=0. It should be noted that Z=0 since the entrance pupil lies in a plane which is perpendicular to the opticial axis 44. Next, the ray 131 impinges upon primary mirror 32 at a point 41 where X= +9.0410 and Z=−1.4389, which means that the vertical projection of the point of impingement 41 upon the optical axis 44 is a distance Z=−1.4389 from the intersection of primary mirror 32 with the optical axis at point 29.

The ray 131 impinges upon the convex secondary mirror 34 (surface 3) at a point 42 where X= +0.6748 and Z=−0.0175.

Z is a negative value since the surface of secondary mirror 34 is convex, when viewed from the primary mirror 32, so that the vertical projection of the point of impingement 42 of ray 131 upon the optical axis 44 lies to the left of the intersection of the secondary mirror 34 with the optical axis 44.

Ray 131 next impinges upon tertiary mirror 36 (surface 4) at point 43 where X=−5.9535 and Z=−0.7568, with Z again being the distance between the intersection of point 43 with the optical axis 44, and the intersection of the tertiary mirror 36 with the optical axis 44.

Finally, the ray 131 impinges upon the focal plane 38 at point 49 where X=−2.1638 and Z=0 since the focal plane 38 is a plane surface perpendicular to the optical axis 44.

The X and Z values of the points of passing through, or impinging upon, the five surfaces 1 through 5 of rays 150 and 130 of FIG. 2, are also, shown in TABLE II, and can be traced from surface to surface precisely in the same manner as was done above with respect to ray 131.

It is to be understood that the forms of the invention shown and described herein is but one preferred embodiment thereof and that other suitable forms of the invention with different sets of parameters will be evident to one of ordinary skill in the art and are intended to fall within the scope of this invention as defined in the claims appended hereto.

I claim:

1. An optical system employable as a telescope or a collimator and having an optical axis and comprising;
    an easily accessible entrance or exit pupil, depending whether used as telescope or collimator;
    an off-axis concave primary mirror for reflecting radiation received by said entrance pupil in a converging pattern towards said optical axis when said optical system is employed as a telescope;
    a secondary convex mirror positioned on said optical axis for reflecting radiation received from said primary mirror in a diverging pattern which lies on or close to said optical axis, said secondary mirror being spaced from said primary mirror a greater distance than the focal length of said primary mirror to produce an intermediate image between said primary and secondary mirrors to facilitate stray radiation suppression;
    a tertiary concave mirror positioned on said second side of said optical axis for receiving and reflecting the radiation reflected from said secondary convex mirror in a converging path along said second side of said optical axis; and
    means for receiving the radiation reflected from said tertiary concave mirror at focal plane.

2. An optical system as in claim 1 comprising a radiation source at said focal plane when said optical system is employed as a collimator, and in which the radiation from said radiation source is reflected from said tertiary mirror to said secondary mirror, and from said secondary mirror to said primary mirror and then from said primary mirror to said exit pupil as a collimated beam.

3. The optical system as in claim 2 wherein said entrance pupil is moveable and therefore does not necessarily fall into the same plane as the exit pupil.

4. An optical system as in claim 1 which said primary mirror is aspheric and in which said secondary and said tertiary mirrors are spherical.

5. An optical system employable as a telescope or a collimator and having an optical axis and comprising:
    an entrance pupil which receives radiation;
    an off-axis primary mirror for reflecting the radiation passing through said entrance pupil in a converging pattern towards said optical axis when said optical system is employed as a telescope;
    a secondary mirror positioned on said optical axis for reflecting the radiation from said primary mirror in a diverging pattern towards the second side of said optical axis, said secondary mirror being spaced from said primary mirror to produce an intermediate image between said primary and secondary mirrors to facilitate suppression of stray radiation;
    a tertiary mirror for reflecting the radiation reflected from said secondary mirror in a converging second path which lies on the second side of said optical axis;

means for receiving the radiation reflected from said tertiary mirror at the focal plane.

6. An optical system as in claim 5 comprising a radiation source at said focal plane of said tertiary mirror when the optical system is employed as a collimator, and in which said radiation source is reflected from said tertiary mirror to said secondary mirror, and from said secondary mirror to said primary mirror and then from said primary mirror to said exit pupil as a collimated beam.

7. An optical system as in claim 5 in which said primary mirror is aspheric and in which said secondary and said tertiary mirrors are spherical.

* * * * *